Figure 1:
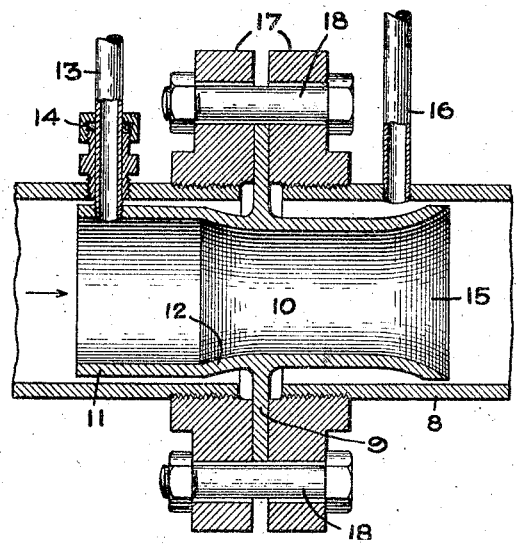

H. H. MAPELSDEN.
PRESSURE DIFFERENCE CREATING DEVICE FOR FLOW METERS AND THE LIKE.
APPLICATION FILED SEPT. 4, 1918.

1,298,532. Patented Mar. 25, 1919.

Inventor,
Harold H. Mapelsden,
by
His Attorney.

UNITED STATES PATENT OFFICE.

HAROLD H. MAPELSDEN, OF SCHENECTADY, NEW YORK, ASSIGNOR TO GENERAL ELECTRIC COMPANY, A CORPORATION OF NEW YORK.

PRESSURE-DIFFERENCE-CREATING DEVICE FOR FLOW-METERS AND THE LIKE.

1,298,532.  Specification of Letters Patent.  Patented Mar. 25, 1919.

Application filed September 4, 1918. Serial No. 252,665.

*To all whom it may concern:*

Be it known that I, HAROLD H. MAPELSDEN, a citizen of the United States, residing at Schenectady, county of Schenectady, State of New York, have invented certain new and useful Improvements in Pressure-Difference-Creating Devices for Flow-Meters and the like, of which the following is a specification.

The present invention relates to pressure difference creating apparatus or devices such as are associated with a conduit through which a fluid flows and create a pressure difference which bears a definite relation to the rate of flow. One of the principal applications for pressure difference creating devices of this type is in connection with flow meters, the leading and trailing pressure pipes in such case being connected to a suitable U-tube manometer or similar instrument for indicating or indicating and recording pressure differences set up. Such devices may however, find other applications being adapted for use wherever it may be desired to utilize a pressure difference which bears a definite relation to the flow of fluid through a conduit. The invention relates particularly to a pressure difference creating apparatus or device of the so-termed "orifice" type which consists of a disk which extends across the conduit and has an opening through it of lesser diameter than the conduit. This forms a restricted passage in the conduit and the leading and trailing pressures are taken off from the up stream and down stream sides of the disk respectively as is well understood.

In finding the flow through an orifice, two of the factors which enter into it are the area of the orifice and the area of the conduit on the up stream side of the orifice. These must be accurately known because their relation to each other affects the value of the constant of the meter. The orifice can be made with a very exact area. Conduits however, such as are met with in ordinary practice, vary considerably from their intended diameters and often are not round. As a result the conduit area at the point of the up stream meter connection must be determined separately for each installation, and this not only increases the cost of installation but also is likely to introduce errors due to the difficulty of determining accurately the exact conduit area.

Furthermore, with orifices of ordinary structure it is necessary for the manufacturer to carry in stock or be prepared to furnish a large number of different sizes, for the size to be used depends not only on the conduit diameter but also on the rate of flow.

One of the primary objects of my invention is to provide an improved pressure difference creating device of the "orifice" type which is independent of the conduit diameter and which is adapted for use in conduits of various diameters so as to decrease the number of sizes required to meet the commercial demand.

In practice, a condition is sometimes met with where the direction of flow varies from time to time being at one time in one direction and at another time in the other direction, and a further object of my invention is to provide a pressure difference creating device which when installed may be used for flow in either direction.

For a consideration of what I believe to be novel and my invention, attention is directed to the accompanying description and the claims appended thereto.

Figure 2:
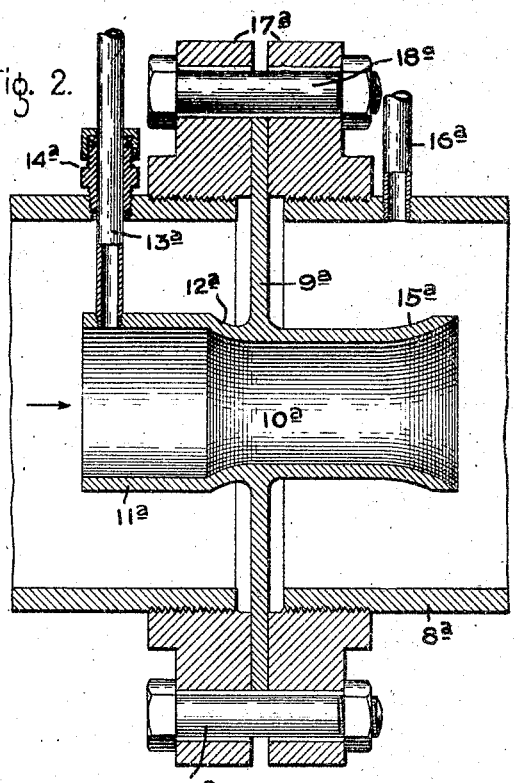
Figure 3:
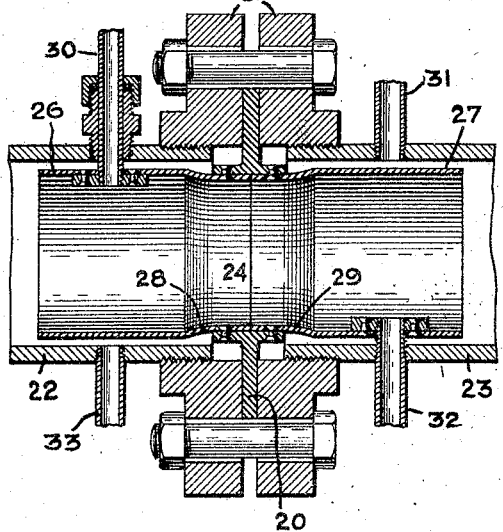
Figure 4:
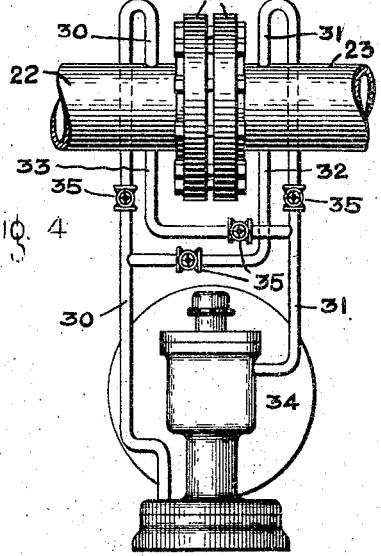

In the drawing, Figure 1 is a longitudinal sectional view of a pressure difference creating device embodying my invention; Fig. 2 is a view similar to Fig. 1, showing the device of Fig. 1 used in a larger conduit; Fig. 3 is a longitudinal sectional view of a pressure difference creating device adapted to measure flow in either direction, and Fig. 4 shows the arrangement of Fig. 3 connected to a single meter instrument.

Referring to the drawing, Fig. 1, 8 indicates a conduit through which a fluid to be metered flows and 9 an annular disk or plate having an orifice 10. On the up stream side of the disk 9 is a straight tube or pipe section 11 of slightly greater diameter than the orifice 10 and connected to the wall at the periphery of the orifice by a rounded or curved wall 12 which serves to direct the fluid from the tube 11 to the orifice in a smooth, even manner. The leading pressure is taken through a pipe 13 which connects with the inside of tube 11 preferably adjacent its up stream end. Pipe 13 extends through an opening in conduit 8 and is surrounded by a suitable stuffing box 14 to prevent leakage. By this means the leading pressure is taken from a pipe section having an exact area, and is not dependent on the exact area of the main conduit 8. On the down stream side disk 9 is provided with a nozzle 15 which flares outwardly so as to direct the fluid flowing therefrom in a smooth, even manner and the trailing pressure pipe 16 is connected to conduit 8 at a point between disk 9 and the end of nozzle 15. This connection is made at such point because it has been found that with an orifice having a nozzle pointing down stream the pressure drop is substantially the same at all points in the space between the down stream side of the disk and the end of the nozzle. The disk 9 is clamped between flanges 17 on adjacent conduit ends by bolts 18.

In Fig. 2, a pressure difference creating device similar to that of Fig. 1 is shown except that the disk 9ª which corresponds to disk 9 of Fig. 1 is of greater diameter thereby permitting the pressure difference creating device to be used in a larger conduit. Fig. 2 is intended to show how the device of Fig. 1 is adapted to conduits of a size larger than that of Fig. 1 and reference numerals have been used on Fig. 2 the same as those on Fig. 1 except that the exponent *a* has been added.

As is well understood, pipes 13 and 16 of Fig. 1 and pipes 13ª and 16ª of Fig. 2 lead to any suitable type of indicating or indicating and recording instrument.

Fig. 3 shows an arrangement similar to that of Figs. 1 and 2 except that both sides of the disk containing the orifice are provided with straight pipe sections thereby adapting the pressure difference creating device for measuring flow in either direction. 20 indicates the annular disk or plate, held between flanges 21 on conduit sections 22 and 23, and 24 indicates the orifice. On the two sides of disk 20 are straight tubes or pipe sections 26 and 27 connected to the wall at the periphery of the orifice 24 by curved walls 28 and 29. 30 and 31 indicate leading and trailing pipes respectively for flow in a direction from left to right, and 32 and 33 indicate leading and trailing pipes respectively for flow from right to left. These sets of pipes may be connected to separate indicating or indicating and recording instruments as is usual or they may be connected to the same instrument.

In cases where the direction of flow may change at any time and it is not known in advance which direction the flow will be at any instant, one set of pipes as the set comprising pipes 30 and 31 is connected to one instrument in the usual manner and the other set of pipes comprising pipes 32 and 33 is connected to another instrument in the usual manner. One instrument will then measure flow in one direction and the other instrument will measure flow in the other direction.

In cases where, although the conditions are such that flow may take place in either direction, it is known in advance in which direction the flow will be, an arrangement embodying a single instrument as shown in Fig. 4, may be used. In Fig. 4 the two sets of pipes 30, 31 and 32, 33 are connected to the two sides of an instrument 34 and are provided with suitable valves 35, the pipes 30 and 32 being connected to the leading side of instrument 34 and the pipes 31 and 33 being connected to the trailing side thereof. Now when the flow is from left to right the valves 35 in pipes 30 and 31 are opened and the valves 35 in pipes 32 and 33 are closed. The instrument 34 will then measure flow from left to right. If now the flow is from right to left, then the valves 35 in pipes 30 and 31 are closed and the valves 35 in pipes 32 and 33 are opened, the instrument 34 will then measure flow from right to left.

The disk or plate with the orifice therein and the tubes or pipe sections connected therewith may be made up in any suitable manner. In Figs. 1 and 2 an integral structure is shown, the parts being cast or otherwise formed all in one piece. In Fig. 3 a built up structure is shown, the disk or plate 20 being provided with short flanges adjacent the orifice therein to which pipe sections 26 and 27 are fastened as by means of rivets.

With the foregoing arrangements it will be clear that the accuracy of a flow meter embodying my invention does not depend on the exactness with which the conduit area is determined and in fact is quite independent of it. As a result the constant for a flow meter can be accurately calculated before the meter is installed. Furthermore, the same orifice arrangement may be used for pipes of a considerable range in diameter. Also, the improved orifice arrangement has the advantage that it is not affected by eddies in the flow and hence it may be used directly adjacent elbows, gate valves, or other devices which are found in conduits and which set up eddies in the flow.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is:

1. The combination with a conduit through which a fluid flows, of an apparatus associated with the conduit for setting up a pressure difference which bears a definite relation to the rate of flow through the conduit, said apparatus comprising an annular disk extending transversely of the conduit and forming an orifice, a straight section of pipe connected to the disk at the periphery of the orifice and pointing up stream, a leading pressure pipe connected with said straight pipe section, and a trailing pressure pipe connected with the conduit on the down stream side of said disk.

2. The combination with a conduit through which a fluid flows, of an apparatus associated with the conduit for setting up a pressure difference which bears a definite relation to the rate of flow through the conduit, said apparatus comprising an annular disk extending transversely of the conduit and forming an orifice, a straight section of pipe connected to the disk at the periphery of the orifice and pointing up stream, a tube similarly connected with said disk and extending down stream, a leading pressure pipe connected with said straight pipe section, and a trailing pressure pipe connected with the conduit between said disk and the down stream end of said tube.

3. The combination with a conduit through which a fluid flows, of an apparatus associated with the conduit for setting up a pressure difference which bears a definite relation to the rate of flow through the conduit, said apparatus comprising an annular disk extending transversely of the conduit and forming an orifice, a straight section of pipe on each side of the disk and connected thereto at the periphery of the orifice, a leading pressure pipe connected to each straight pipe section, and a trailing pressure pipe connected to the conduit on each side of the disk at a point between the disk and the end of the adjacent pipe section.

4. The combination with a conduit through which a fluid flows, of an apparatus associated with the conduit for setting up a pressure difference which bears a definite relation to the rate of flow through the conduit, said apparatus comprising an annular disk extending transversely of the conduit and forming an orifice, a straight section of pipe on each side of the disk and connected thereto at the periphery of the orifice, a pressure responsive mechanism, leading pressure pipes connecting it to each of said straight pipe sections, and trailing pressure pipes connecting it to the conduit on each side of said disk.

5. The combination with a conduit through which a fluid to be metered flows, of a pressure difference creating device of the "orifice" type associated therewith and comprising a disk which extends across the conduit and has an orifice therein, a straight section of pipe connected to the disk on the up stream side, a leading pressure pipe connected to said straight section of pipe and extending out through the conduit, a section of pipe connected to the disk on the down stream side, and a trailing pressure pipe connected with the conduit on the down stream side of the disk between said disk and the end of last-named section of pipe.

In witness whereof, I have hereunto set my hand this 3rd day of September, 1918.

HAROLD H. MAPELSDEN.